May 3, 1955 D. RUBIN Re. 23,995

GARMENT HOLDING BAG

Original Filed Sept. 17, 1951

INVENTOR.
DAVID RUBIN
BY
Whittemore Halbert & Carter
ATTORNEYS

United States Patent Office

Re. 23,995
Reissued May 3, 1955

23,995

GARMENT HOLDING BAG

David Rubin, Detroit, Mich.

Original No. 2,635,740, dated April 21, 1953, Serial No. 246,981, September 17, 1951. Application for reissue February 4, 1954, Serial No. 408,315

6 Claims. (Cl. 206—7)

Matter enclosed in heavy brackets [ ] appears in the original patent but forms no part of this reissue specification; matter printed in italics indicates the additions made by reissue.

The invention relates to garment holding bags and has for its object the obtaining of an exceedingly simple construction which may be easily engaged with a garment while supported on a hanger and will completely enclose the same to protect from dust or insects.

It is a further object to obtain an exceedingly simple construction which can be manufactured at such low cost as to adapt it for use by merchants as a wrapper for a garment sold, which may be subsequently used for protection of a stored garment.

With these objects in view the invention consists in the construction as hereinafter set forth.

Figure 1:
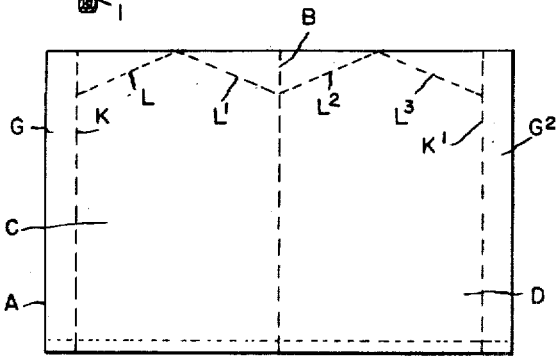
Fig. 1 is a plan view of the blank from which the bag is formed by folding.

As illustrated in Fig. 1, a rectangular blank A of strong paper or other suitable sheet material is folded along an intermediate vertical line B to form registering front and rear portions C and D. These portions are secured to each other adjacent to the bottom edge throughout the entire width thereof, while at the top edge they are attached to each other through one-half of the width, or from the folded edge to the center as indicated at E. On the other side of the center, the upper ends of the portions C and D are separable from each other so as to permit of drawing over a garment while the latter is supported by a hanger. At least one of these separable portions is provided at its top with an inturned flap F forming a pocket F′ for engaging the top of the garment. Also preferably the vertical edge portion has a flap G which is folded inward to form a pocket G′ forming a continuation of the pocket F′. Thus if the bag is drawn over a garment supported on a hanger, the top portion of said garment may be tucked into the pocket F′ and the outer edge portion into the pocket G′, after which the other of said registering front and back portions can be closed over the garment and the flaps F and G. Preferably both of the registering portions C and D are provided with flaps forming top and side pockets, and as shown the portion D has a flap $F^2$ forming a pocket $F^3$ and also a flap $G^2$ forming a pocket $G^3$. With such construction after the bag has been drawn over the garment and the latter has been tucked into the pockets F′ and G′, said pockets with the garment therein may be tucked into the pockes $F^3$ and $G^3$ which will complete the enclosure. Snap fasteners or any other suitable fastening means indicated at H may be employed for holding the bag tightly closed. After enclosing the garment in the bag as just described, the latter may if desired have its bottom portion folded upward and engaged with the hanger. For this purpose the portions C and D at the lower end of the bag, which are secured to each other preferably by adhesive, have a central reinforcement I thereabout with an aperture J therethrough. Thus the hook of the hanger may be passed through the aperture J when the bottom of the bag is folded upward and will retain both portions in this position.

Garment hangers and particularly those used for men's suits are formed with a top portion which is oppositely inclined from the supporting hook at the center. I therefore preferably form the bag of corresponding shape and during its construction after folding the blank along the line B and the flaps G and $G^2$ along lines K and K′, the top portion may be folded along the lines indicated in the blank as L, L′, $L^2$ and $L^3$, the line L being in registration with the line $L^3$ and the line L′ in registration with the line $L^2$. This also saves material as the blank need not be extended vertically to form the flaps.

Figure 2:
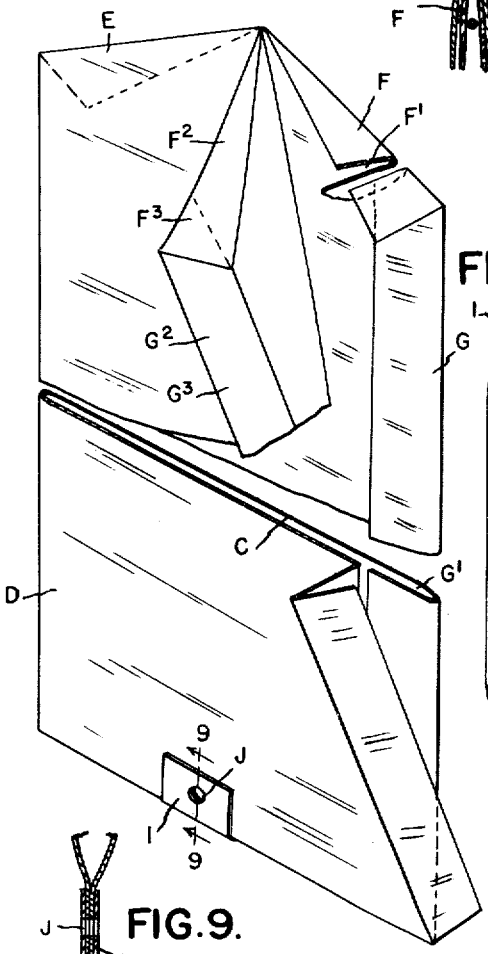
Fig. 2 is a perspective view of my improved garment holding bag as open to receive a garment having portions broken away to disclose the construction.
Figure 4:
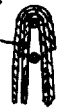
Fig. 4 is the section on line 4—4, Fig. 3.
Figure 3:
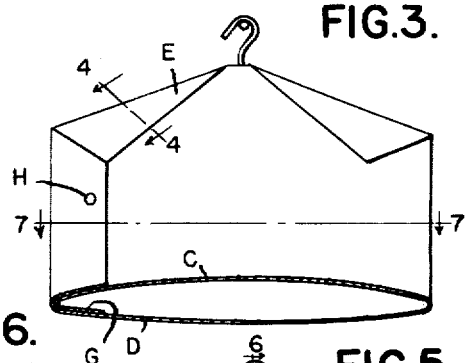
Fig. 3 is an elevation of the bag with the garment enclosed therein and supported on a hanger, being viewed from the reverse side of Fig. 2.
Figure 6:
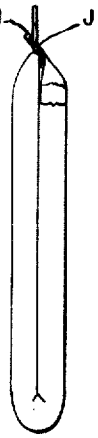
Fig. 6 is a section on line 6—6, Fig. 5.
Figure 5:
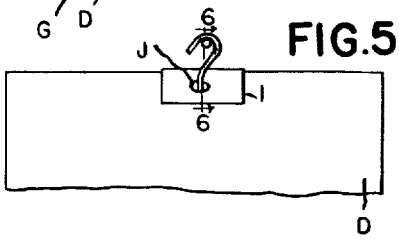
Fig. 5 is an elevation similar to Fig. 3 but with the bottom of the bag folded upward and engaged with the hanger.
Figure 7:
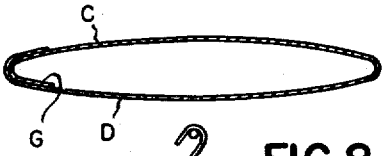
Fig. 7 is a section on line 7—7, Fig. 3.
Figure 8:
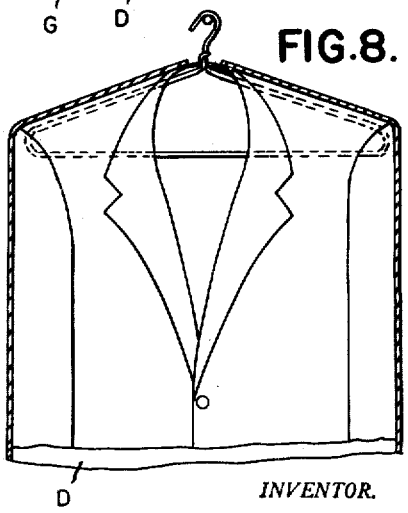
Fig. 8 is a view similar to Fig. 3 showing the bag in section and the garment on the hanger in elevation.
Figure 9:
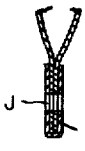
Fig. 9 is a section on line 9—9, Fig. 2.

The bag is so simple in construction and so inexpensive to manufacture that it may be used by merchants as a wrapper for garments sold, and may thereafter be used by the purchaser for the protection of garments not in use. This is another very advantageous feature of the construction. Another important advantage is the ease with which the bag may be engaged with the garment. If as shown in Fig. 8 the garment is supported on a hanger, the bag opened as shown in Fig. 2 can be drawn over the garment and after tucking the top and outer edge of the garment into the pockets F′ and G′ the bag will be held in engagement therewith. With the specific construction illustrated in Fig. 2, the completion of the enclosure is by tucking the portion of the garment in the pockets F′ and G′ into the pockets $F^3$ and $G^3$. However this is not absolutely necessary as the pockets $F^3$ and $G^3$ may be omitted and the flaps $F^2$ and $G^2$ merely folded over the rear side and secured by fasteners.

What I claim as my invention is:

1. A garment holding bag comprising a sheet folded along an intermediate vertical line to form registering front and rear portions, said portions being secured to each other and permanently closed along the bottom edge for the full width thereof and permanently closed at the top for one-half the width from the folded edge to the center, the registering portion of the other half being free for separation and one having at its upper end an inwardly downward turned flap forming a pocket whereby said open bag may be drawn over a garment while supported on a hanger the closed half of the top resting on the corresponding half of said garment and the other half of the garment being tucked into said pocket to be retained thereby.

2. The construction as in claim 1 in which the other one of said front and rear portions has portions folded over the top and side for engaging the pocketed portion after the garment is tucked therein.

3. The construction as in claim 1 in which the portion having the pocket at its upper end is also provided with a folded flap along its vertical edge forming a pocket which is a continuation of said top pocket and into which the garment is tucked.

4. The construction as in claim 3 in which both of said registering front and rear portions have folded flaps forming pockets at the upper end and along the side, the pockets of one portion with the garment therein being tucked into the pockets of the other portion.

5. The construction as in claim 4 in which the closed bottom portion of the bag has a central reinforcement with an aperture therethrough adapted when the bag with the garment therein has its lower portion folded upward to engage the hook of the hanger with such aperture and retain the parts in this position.

*6. A garment holding bag comprising a sheet folded along an intermediate vertical line to form registering front and rear portions, said portions being secured to each other and permanently closed along the bottom edge for the full width thereof and permanently closed at the top for one-half the width from the folded edge to the center, the registering portions of the other half being*

*free for separation, whereby said open bag may be drawn over a garment while supported on a hanger, the closed end of the top resting on the corresponding half of the garment, and means for securing to each other at their outer edges the free portions of the bag to complete the enclosure of the garment.*

References Cited in the file of this patent or the original patent

UNITED STATES PATENTS

| | | |
|---|---|---|
| 952,181 | Bornot | Mar. 15, 1910 |
| 1,098,663 | Cohen | June 2, 1914 |
| 2,224,090 | Tucker et al. | Dec. 3, 1940 |
| 2,534,380 | Schwartzman | Dec. 19, 1950 |

Notice of Adverse Decision in Interference

In Interference No. 87,649 involving Reissue No. 23,995. D. Rubin, Garment holding bag, final judgment adverse to the patentee was rendered August 31, 1956, as to claim 6.

[*Official Gazette October 30, 1956.*]